United States Patent Office 3,148,229
Patented Sept. 8, 1964

3,148,229
METHOD OF MAKING RUBBER BASED COMPOSITE PROPELLANT
Donald R. Bordenkircher, Cuyahoga Falls, and Charles B. Frost, Akron, Ohio, assignors to The General Tire and Rubber Company, Akron, Ohio, a corporation of Ohio
No Drawing. Filed Aug. 14, 1953, Ser. No. 374,434
5 Claims. (Cl. 264—3)

This invention relates to a method of making propellants for use in rockets and jets and particularly relates to an inexpensive and safe method of making propellants in which the oxidants are finely and uniformly dispersed throughout the binder.

The propellant compositions with which this invention is concerned comprises mixtures of 5 to 25 or 30 percent rubber binder and from 60 to 95 percent oxidant or oxidizing agent such as ammonium nitrate or potassium perchlorate. These propellants are relatively stable and crack-resistant at high and low temperatures and are in general use in rockets and in jets for assisting in the take-off of airplanes.

Oxidants such as ammonium nitrate and potassium perchlorate are considered quite difficult and dangerous to handle particularly in contact with organic material. If suddenly jarred or shocked they are liable to explode. Generally they have to be stabilized in some way to make them safer to handle and even then great care must be exercised.

At the same time, in order to form satisfactory propellants the oxidants must be thoroughly dispersed in the binder. In the dispersing process they are usually subjected to considerable handling, rubbing, and the like. Thus it is difficult and seemingly impossible to minimize the handling of the oxidants and at the same time manufacture a satisfactory propellant.

One object of this invention is to make a superior propellant and at the same time do it in comparative safety.

Another object of this invention is to incorporate the oxidizing agent into the rubber binder with a minimum of rubbing and under conditions such that it is not concentrated with organic material in a dry state.

Still another object of this invention is to provide a method of incorporating the oxidizing agent into the rubber binder so that the oxidizing agent in the final propellant is at all times dispersed in fine crystalline form surrounded and protected by the rubber binder.

It is recognized that the compounding of rubber in latex form is old and that the formation of porous articles or articles having thin sections, such as dipped goods made directly from latex, is a major industry. Dipped goods and the like must have thin sections to permit removal of water and cannot be thick and bulky like propellant charges. Likewise, in the compounding processes wherein latex masterbatches with large loadings of fillers, such as carbon black or other materials, are produced, a dilute latex is used for reasons of stability and the latex mixture is coagulated and the water and water soluble materials are separated from the coagulated latex crumb by filtration. This procedure obviously cannot be used with water soluble materials and particularly water-soluble oxidizing agents which are most desirable for use in propellant compositions.

Also, the proportion of compounding agent to rubber is very high in propellant compositions and a technique similar to that used in preparing rubber masterbatches is accordingly not applicable to make a propellant.

In accordance with this invention, we have found that large amounts of oxidizing agent may be added to a concentrated or dilute rubber latex and that it becomes or remains dispersed therein if the latex and oxidizing agent are mixed together and dried with mixing. By continuing agitation in a suitable mixer, for example a dough-type mixer, crystalization or agglomeraiton of oxidizing agent into dangerous oxidizer-rich areas is prevented and at the same time water is removed until a dry, plastic mix is formed. After first incorporating suitable vulcanizing agents and the like this dry plastic mix is then extruded into the desired propellant shape, preferably using an extruder equipped to maintain vacuum on the material therein to eliminate air bubbles. The rubber is thereafter vulcanized or cured to final shape. This gives a stable, crack-resistant propellant with the oxidizing agent finely and uniformly dispersed throughout the rubber binder. It also provides a wet mixing process which minimizes danger of explosion by maintaining the material in a wet state during periods when formation of oxidizer-rich areas occurs. The mixing operation also prevents the later formation of dangerous oxidizer-rich areas during drying that would normally occur by re-crystallization of agglomeration of an unagitated aqueous mixture.

The rubber-latex should be vulcanizable and should preferably be concentrated or creamed so as to contain at least 45 percent rubber solids and preferably around 62 percent solids in order to facilitate the drying process. Any one or more of GR–S rubber (a series of modified butadiene-styrene rubbery copolymers), natural rubber, neoprene rubber, rubber reclaim dispersion, or polysulfide type rubber-latex or mixtures thereof is satisfactory for use in accordance with this process. Lattices of sulfur vulcanizable, natural, or synthetic rubbers are usually preferred.

If the rubber of the latex or of at least part of the latex is sulfur vulcanizable, suitable accelerators which accelerate vulcanization at low temperatures are preferably added to the latex to vulcanize the rubber. Suitable accelerators are one or more of piperidene pentamethylene dithiocarbamate, butyl, zimate, zinc oxide, butyraldehyde and aniline condensation products and the like. Also, a vulcanizing agent such as sulfur should preferably be added to the latex. In any formulation, however, care should be taken not to add acids or strongly acidic material which might tend to catalyze decomposition of the oxidant and form a weak and inflexible propellant. If the latex is not sulfur vulcanizable, another vulcanizing agent suitable for the particular rubber should be present.

The concentrated latex and oxidant are mixed, preferably in a dough-type mixer such as the Baker-Evans, Warner-Phleider, or Day mixers or in roller mixers having different peripheral roller speeds. These dough mixers are capable of exerting great power on the mix and generally comprise two opposed, approximately L shaped arms or paddles each rotating in a section of a divided trough. The arms are driven at relatively slow speeds through the material being mixed. These mixers are used for mixing thick, doughy, plastic masses. The mixer is preferably open or provided with means whereby hot air, nitrogen, or any other inert gas or fluid may be blown over the material during the mixing cycle in order to speed up the drying process.

The oxidant can be added in solution, as a slurry or in dry form prior to mixing or while the mixer is in operation. Suitable oxidants are any of the solid, inorganic strong oxidizing agents or salts commonly used in propellants and explosives such as ammonium nitrate, ammonium perchlorate, potassium perchlorate, and other chlorates, perchlorates, nitrates, manganates, permanganates, and chromates. Of these, ammonium nitrate is preferred.

Mixing is continued until the mass is dry or until a predetermined water content is reached. The dry propellant mixture is extruded or molded to shape and then vulcanized. Until it is vulcanized, it is plastic and readily formed.

The rubber of the latex preferably should have a low plasticity. When natural rubber latex is used, it preferably should be heat softened to low plasticity as for example by heating it in an oven for about a week at 175° F. It also should be stabilized by the addition of any of the conventional stabilizers such as cetyl trimethyl ammonium bromide or other stabilizing dispersing or wetting agent of which there are many recognized in the art.

Instead of heat softening the latex to provide greater plasticity, we can use a combination of rubber and oil to provide a greater plastic rubbery binder and eliminate the heat-softening step. From approximately one-half or one part by weight of oil up to four or five parts by weight of oil may be added for each part by weight of rubber solids. Suitable oils are any of the paraffinic or aliphatic coils derived from the distillation of petroleum or the oils derived from the thermal decomposition of coal or other oils compatible with the rubber. Suitable oils are listed in Table 5 on page 313 of the June 1951 issue of "India Rubber World." Compatible oily organic liquids which are not hydrocarbons may also be used.

When oil is used, it is stirred into stabilized rubber latex until a stable oil-in-water emulsion is formed. This generally has the consistency of mayonnaise and contains from 8 or 10 up to 25 or 30 percent water. This emulsion is poured into the mixer and the oxidizing agent is added as the mixer runs. It can be added dry or aqueous solution. Throughout the addition, the mixer should be in operation so as to stir and agitate the emulsion and thoroughly mix in the oxidizing agent. When the oxidizing agent is not highly water soluble and cannot be readily added to the latex, a slurry or dispersion of the oxidizing agent can be made up and mixed into the latex. This can be run through a colloid mill to the desired particle size.

The latex is substantially constantly mixed together with the inorganic oxidizing agent until the water has evaporated off and a dry, taffy-like mixture is obtained. This mixture is extruded into a forming mold and vulcanized into the final, shaped propellant charge. In the alternative and when smaller sized grains or charges are desired, the mixture is extruded onto trays and vulcanized to final shape in an oven. Vulcanization is carried out at from room temperature up to 200° F. depending upon the stability of the oxidant used.

When this is done, we have found that a very fine uniform dispersion of the oxidizing agent is provided. The rubber binder covers a very large surface area of oxidizing agent and the oxidizing agent is in small particle size so as to burn uniformly with an even propellant thrust. At the same time, it is thoroughly bound together and water-proofed by the rubber binder so as to be serviceable at hot desert temperatures and at cold, high altitude temperatures without cracking or breaking.

It is very important that the propellant mixture be dried with agitation in the mixer. Apparently the incipient oxidant crystals precipitate out of solution during the drying operation and are not permitted to grow to dangerous oxidizer-rich areas. This forms a propellant composition with the oxidant having a uniform, minute particle size and being uniformly distributed throughout the binder. In addition, the binder covers a very large surface area.

The following examples illustrate our invention:

*Example 1*

161 grams of creamed natural rubber latex containing 100 grams of rubber solids and constituting a 62 percent natural rubber latex was obtained from commercial sources. This latex was stabilized by the addition of 5 grams of an anionic active stabilizing agent. After the addition of the stabilizing agent, 300 grams of Circo Light Process Oil (a relatively volatile odorless petroleum distillate oil obtained from the cracking process and having a specific gravity of 0.92 and a Saybolt viscosity at 100° F. of about 155 seconds) was stirred into the stabilized latex with vigorous agitation until a smooth and stable oil-in-water latex emulsion was formed. This oil-rubber latex emulsion contained 13 percent water and had the consistency of mayonnaise.

15 grams of warm water were added to 85 grams of ammonium nitrate and the resultant solution was mixed into 17.2 grams of the oil-rubber emulsion. The oil-rubber emulsion contained 15 grams of oil and rubber and 2.2 grams of water. The final mixed, wet propellant now contained only 14.7 percent water and was in the form of a smooth paste.

This wet mixture was placed in a Baker-Evans mixer and kept in constant agitation until it was dry. During the drying, a stream of dry air was blown over the bath. After a relatively short drying period, a phase inversion occurred and the smooth paste toughened up and ejected the water as a separate phase. Mixing was continued and within thirty minutes a dry plastic propellant mix was obtained.

This mixture was extruded under vacuum into a propellant casing and cured in place. When the propellant was examined it was found that the particle size of the ammonium nitrate was most minute and very uniform. When tested, the propellants made in accordance with this process have exceptional thrust characteristics.

*Example 2*

Natural rubber latex was stabilized and an oil-rubber latex emulsion was formed as in Example 1. A high solids dispersion of potassium perchlorate was made up by mixing 100 parts of potassium perchlorate with 60 parts of water and 5 parts of dispersing agent. This mixture was passed through a colloid mill to obtain the desired particle size and then added to 20.5 grams of the oil-rubber-latex emulsion and mixed and dried as previously described. An examination of the propellant formed in this mix showed very fine particle size and even distribution of the particles.

It is understood that in accordance with the provisions of the patent statutes, variations and modifications of the invenion herein shown and described may be made without departing from the spirit of this invention.

Having thus described our invention, what we claim is:

1. A process of making rubber oxidizing salt type propellants comprising the steps of adding an inorganic strong oxidizing salt to a rubber latex and mixing the resultant oxidizing salt rubber latex mixture in a dough-type mixer until substantially all of the water has evaporated and a dry, plastic, vulcanizable mixture is obtained, forming the mixture to shape, and vulcanizing it to the final propellant shape.

2. A process of making rubber oxidizing salt type propellants comprising the steps of adding to a concentrated rubber latex from one-half to five parts of plasticizing, rubber-compatible oil for each part of rubber solids to form an oil-in-water latex emulsion, adding an inorganic, strong oxidizing salt in aqueous solution to this oil-in-water emulsion, and mixing the oxidizing salt and oil-in-water emulsion together in a dough-type mixer until a plastic, dry vulcanizable mixture is formed, extruding the mixture to shape, and vulcanizing it to form a stable, shaped propellant charge.

3. A process of making rubber-oxidizing salt type propellants comprising the steps of adding to a concentrated rubber latex from one-half to five parts of rubber-compatible, plasticizing oil for each part of rubber solids to form an oil-in-water latex emulsion, mixing a substantially water-insoluble, strong oxidizing salt in aqueous slurry into this oil-in-water emulsion, and mixing the oxidant and emulsion together in a dough-type mixer until a dry, plastic, vulcanizable mixture is formed, extruding this mixture to shape, and vulcanizing it to form a stable, shaped propellant charge with uniformly and finely dispersed oxidizing salt particles throughout.

4. A process of making rubber-oxidizing salt type propellants comprising the steps of adding to a concentrated rubber latex from one-half to five parts of a rubber-compatible, plasticizing oil for each part of rubber solids in the latex to form an oil-in-water latex emulsion, adding an inorganic, strong oxidizing salt to this oil-in-water emulsion, mixing the oxidizing salt and oil-in-water emulsion together in a dough-type mixer until a plastic, substantially dry vulcanizable mixture is formed, simultaneously blowing dry, warm inert gas over the mixture, extruding the mixture to shape, and vulcanizing it to form a stable, shaped propellant charge.

5. A process of making rubber-oxidizing salt type propellants comprising the steps of adding an inorganic strong oxidizing salt to a plasticized rubber latex, kneading the resultant mixture together in a dough-type mixer until substantially all of the water has evaporated and a substantially dry, plastic, vulcanizable rubber mixture comprising at least 60 percent oxidizing salt and 5 percent rubber is obtained, forming the mixture to shape, and vulcanizing it to the final propellant shape.

References Cited in the file of this patent

UNITED STATES PATENTS

| | | |
|---|---|---|
| 2,646,596 | Thomas et al. | July 28, 1953 |

FOREIGN PATENTS

| | | |
|---|---|---|
| 248,089 | Great Britain | Mar. 1, 1926 |
| 655,585 | Great Britain | July 25, 1951 |